(12) United States Patent
Eun

(10) Patent No.: US 10,614,205 B2
(45) Date of Patent: Apr. 7, 2020

(54) DEVICE, AUTHENTICATION PROCESSING METHOD, AND COMPUTER PROGRAM PRODUCT

(71) Applicant: Jongsook Eun, Tokyo (JP)

(72) Inventor: Jongsook Eun, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 141 days.

(21) Appl. No.: 15/556,105

(22) PCT Filed: Mar. 9, 2016

(86) PCT No.: PCT/JP2016/001312
§ 371 (c)(1),
(2) Date: Sep. 6, 2017

(87) PCT Pub. No.: WO2016/143346
PCT Pub. Date: Sep. 15, 2016

(65) Prior Publication Data
US 2018/0046791 A1    Feb. 15, 2018

(30) Foreign Application Priority Data

Mar. 10, 2015    (JP) ................................. 2015-047270

(51) Int. Cl.
*H04L 29/06*    (2006.01)
*G06F 21/34*    (2013.01)
(Continued)

(52) U.S. Cl.
CPC ............ *G06F 21/34* (2013.01); *G06F 21/608* (2013.01); *H04N 1/00* (2013.01); *H04N 1/00244* (2013.01);
(Continued)

(58) Field of Classification Search
CPC . H04L 63/08; H04L 63/0838; H04L 63/0853; G06F 21/22; G06F 21/608;
(Continued)

(56) References Cited

U.S. PATENT DOCUMENTS 5,267,315 A    11/1993  Narita et al.
6,144,959 A *  11/2000  Anderson ............... G06F 21/31
(Continued)

FOREIGN PATENT DOCUMENTS

CN    101968837 A    2/2011
CN    103995993 A    8/2014
(Continued)

OTHER PUBLICATIONS

Jerome H. Saltzer, Protection and the Control of Information Sharing in Multics, Jul. 1974, ACM, vol. 17, No. 7, pp. 388-402. (Year: 1974).*

(Continued)

*Primary Examiner* — Luu T Pham
*Assistant Examiner* — Fahimeh Mohammadi
(74) *Attorney, Agent, or Firm* — Oblon, McClelland, Maier & Neustadt, L.L.P.

(57) ABSTRACT

A device includes a first unit and a second unit, wherein, a first storage controller of the first unit stores in a first storage authentication information used for user authentication, a provision controller of the first unit controls a function provider of the first unit to provide a predetermined function when an authorized user is obtained, a first acquirer of the second unit acquires the authentication information before performance of the user authentication, a first generator of the second unit generates priority user information representing of the acquired authentication information, authentication information corresponding to a user who has been authenticated in user authentication as an authorized user, to (Continued)

which user authentication time information is added, and an authenticator of the second unit performs user authentication by collating the input authentication information with the priority user information and supplies the provision controller of the first unit with a user authentication result.

7 Claims, 7 Drawing Sheets

(51) Int. Cl.
*G06F 21/60* (2013.01)
*H04N 1/44* (2006.01)
*H04N 1/00* (2006.01)

(52) U.S. Cl.
CPC .............. *H04N 1/44* (2013.01); *H04N 1/4426* (2013.01); *G06F 2221/2137* (2013.01); *H04N 2201/0094* (2013.01)

(58) Field of Classification Search
CPC .. G06F 21/31; G06F 21/34; G06F 2221/2137; G06G 21/608
See application file for complete search history.

(56) References Cited

U.S. PATENT DOCUMENTS

| | | | |
|---|---|---|---|
| 6,651,168 B1 | 11/2003 | Kao | |
| 9,367,780 B2 | 6/2016 | Urasawa | |
| 9,742,770 B2 | 8/2017 | Belton et al. | |
| 9,852,275 B2 | 12/2017 | Sambamurthy et al. | |
| 2002/0046338 A1 | 4/2002 | Ueda et al. | |
| 2002/0129285 A1* | 9/2002 | Kuwata | G06F 21/32 726/3 |
| 2002/0165965 A1* | 11/2002 | Frederiksen | H04L 67/1002 709/226 |
| 2003/0177363 A1 | 9/2003 | Yokota et al. | |
| 2005/0223233 A1 | 10/2005 | Ishidera | |
| 2006/0064753 A1* | 3/2006 | Otake | G06F 21/608 726/19 |
| 2006/0171005 A1 | 8/2006 | Eun | |
| 2006/0215201 A1 | 9/2006 | Shimizu et al. | |
| 2006/0271781 A1* | 11/2006 | Murakawa | G06F 21/31 713/168 |
| 2007/0008583 A1 | 1/2007 | Araki | |
| 2007/0076241 A1* | 4/2007 | Okamoto | H04N 1/00244 358/1.14 |
| 2008/0178265 A1* | 7/2008 | Tsuchiya | G06F 21/34 726/3 |
| 2008/0209569 A1* | 8/2008 | Araki | G06F 21/105 726/26 |
| 2008/0235434 A1 | 9/2008 | Eun et al. | |
| 2008/0283592 A1 | 11/2008 | Oder, II ("J.D.") et al. | |
| 2009/0055925 A1 | 2/2009 | Masui | |
| 2010/0077457 A1 | 3/2010 | Xu et al. | |
| 2010/0149574 A1 | 6/2010 | Eun et al. | |
| 2010/0205449 A1* | 8/2010 | Eun | G06Q 20/341 713/185 |
| 2011/0041144 A1 | 2/2011 | Araki | |
| 2011/0099626 A1* | 4/2011 | Tsujimoto | H04N 1/00344 726/18 |
| 2011/0225600 A1 | 9/2011 | Araki | |
| 2012/0011580 A1 | 1/2012 | Eun et al. | |
| 2012/0096528 A1 | 4/2012 | Daigo | |
| 2012/0212779 A1 | 8/2012 | Araki | |
| 2012/0216062 A1 | 8/2012 | Araki | |
| 2013/0061319 A1* | 3/2013 | Yasuhara | G06F 21/41 726/19 |
| 2013/0254903 A1 | 9/2013 | Araki | |
| 2013/0321847 A1 | 12/2013 | Eun | |
| 2013/0333002 A1 | 12/2013 | Belton et al. | |
| 2014/0229931 A1 | 8/2014 | Araki | |
| 2014/0245414 A1 | 8/2014 | Eun | |
| 2014/0282877 A1 | 9/2014 | Mahaffey et al. | |
| 2014/0289837 A1* | 9/2014 | Tomita | H04L 63/0838 726/8 |
| 2015/0049357 A1* | 2/2015 | Urasawa | G06K 15/4095 358/1.14 |
| 2015/0074667 A1 | 3/2015 | Araki | |
| 2015/0096016 A1* | 4/2015 | Ren | G06F 21/34 726/20 |
| 2015/0215480 A1* | 7/2015 | Chiyo | H04N 1/00204 358/1.15 |
| 2015/0264211 A1 | 9/2015 | Araki | |
| 2016/0275282 A1 | 9/2016 | Araki | |
| 2017/0277879 A1 | 9/2017 | Taniguchi | |

FOREIGN PATENT DOCUMENTS

| | | |
|---|---|---|
| JP | 2010-004568 | 1/2010 |
| JP | 2013-176990 | 9/2013 |
| JP | 5354665 | 9/2013 |
| JP | 2013-222351 | 10/2013 |

OTHER PUBLICATIONS

Yun-Seok Lee et al., A Smart Card based user authentication scheme for multi-server environment, Feb. 21-23, 2011, ACM, pp. 1-7. (Year: 2011).*

Amlan Jyoti Choudhury et al., A Strong User Authentication Framework for Cloud Computing, Jan. 12, 2012, IEEE, pp. 110-115. (Year: 2012).*

Jiang Tao et al, Design of Power Utilization System making use of IC Card in Student Dormitory by MCU, Sep. 18, 2009, IEEE, pp. 2368-2372. (Year: 2009).*

Office Action dated Mar. 12, 2019 in co-pending U.S. Appl. No. 15/073,371, 22 pages.

Office Action dated Nov. 28, 2018 in co-pending U.S. Appl. No. 15/073,371.

International Search Report dated Jun. 7, 2016 in PCT/JP2016/001312 filed Mar. 9, 2016.

Office Action dated Nov. 26, 2019 in Chinese Patent Application No. 201680014156.2, with English translation.

* cited by examiner

[Fig. 1]
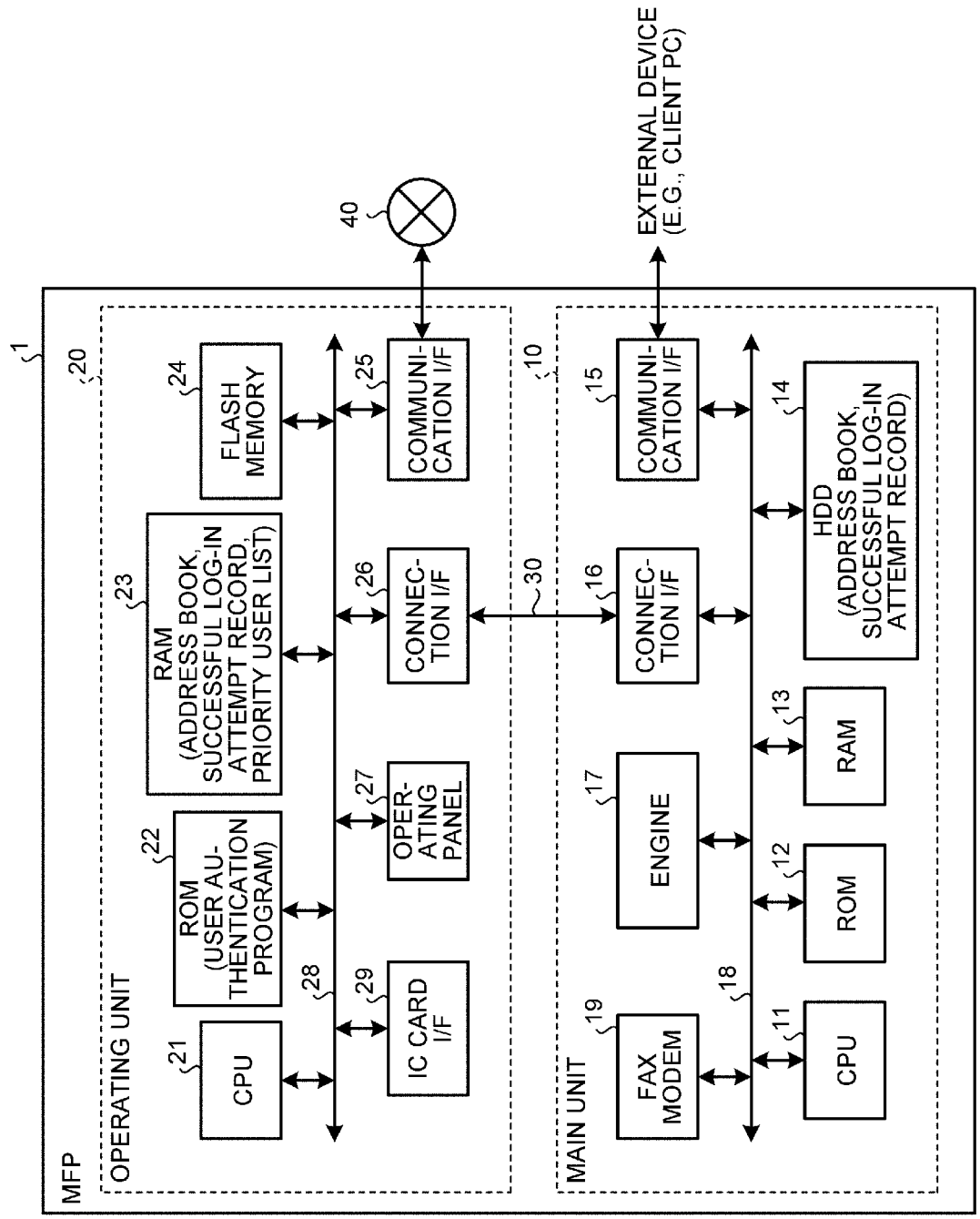

[Fig. 2]
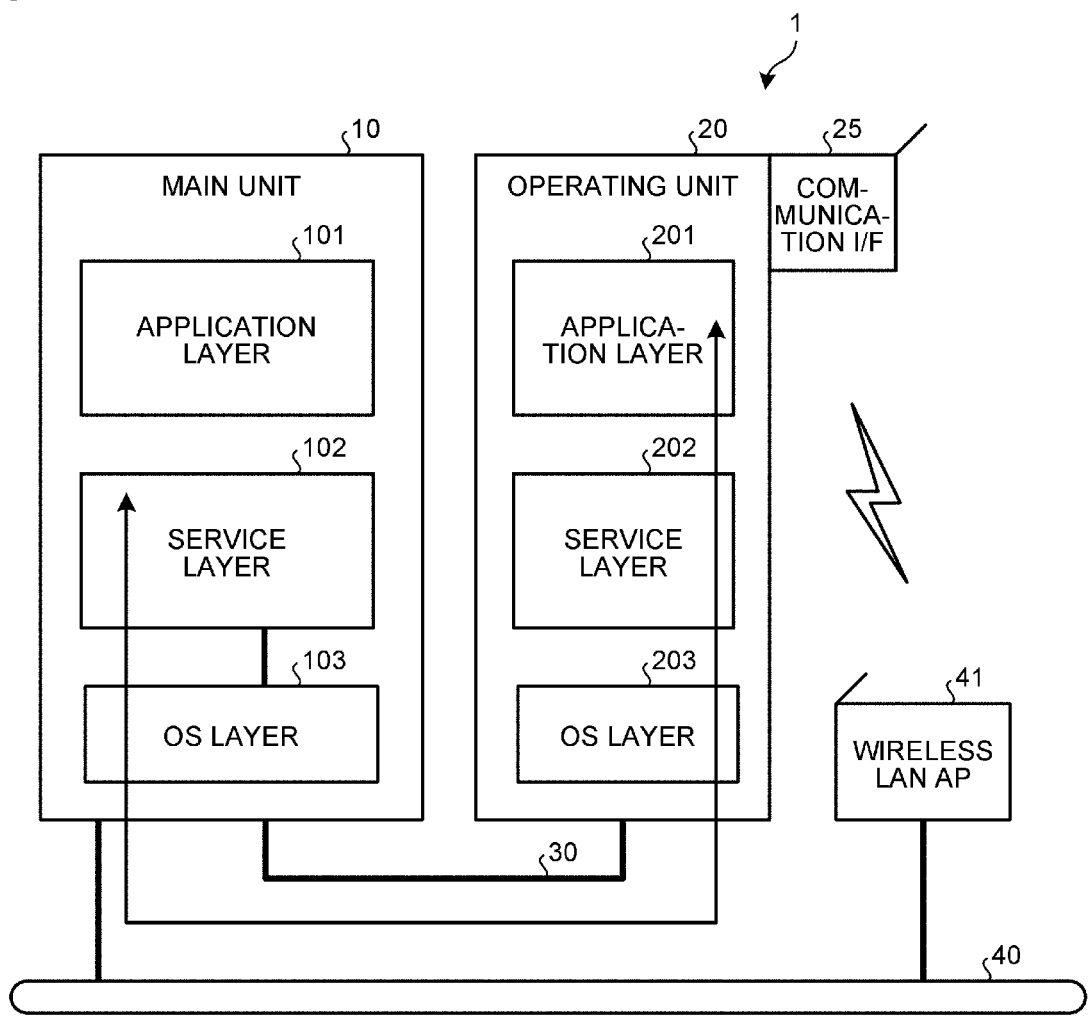

[Fig. 3]
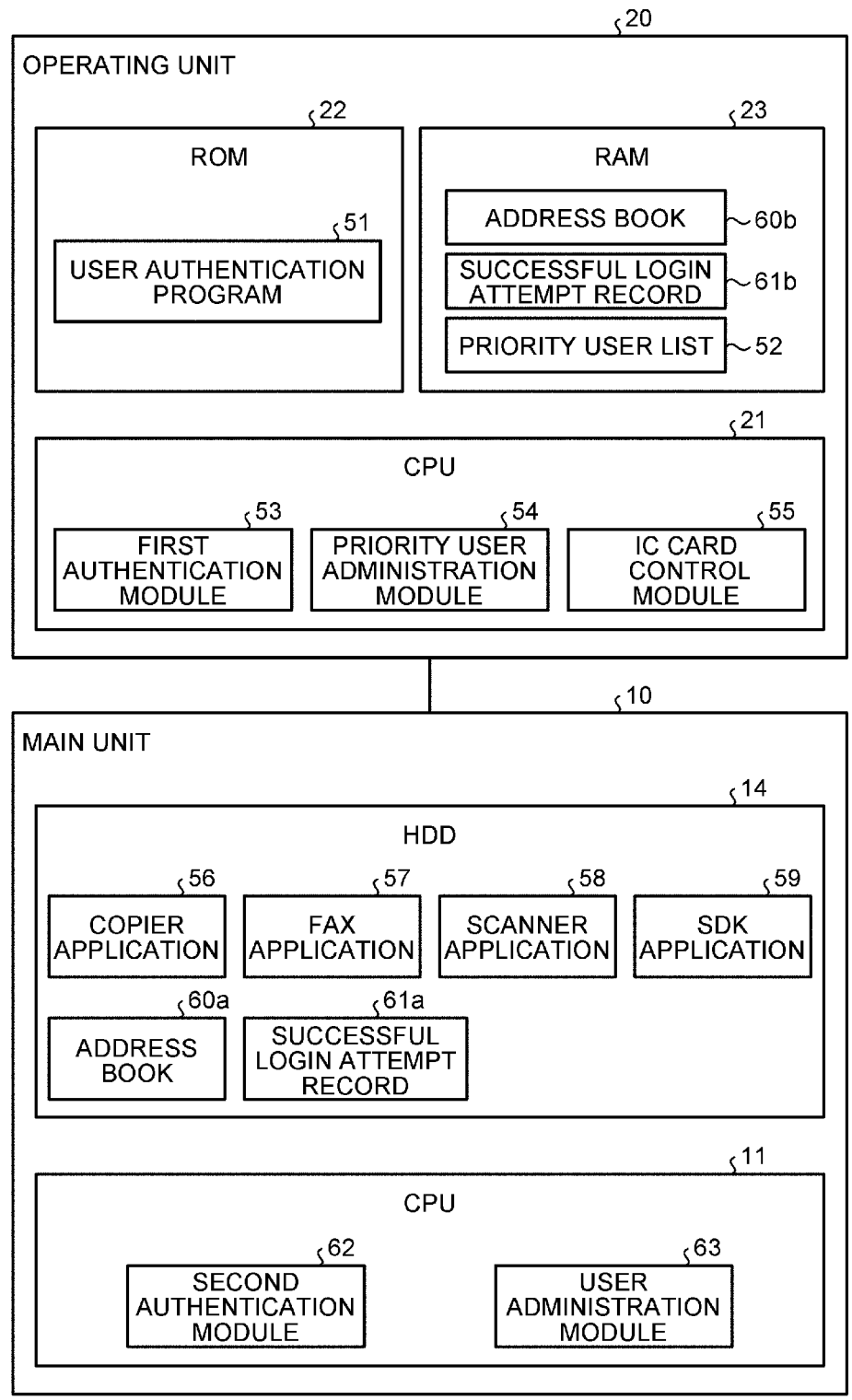

[Fig. 4]
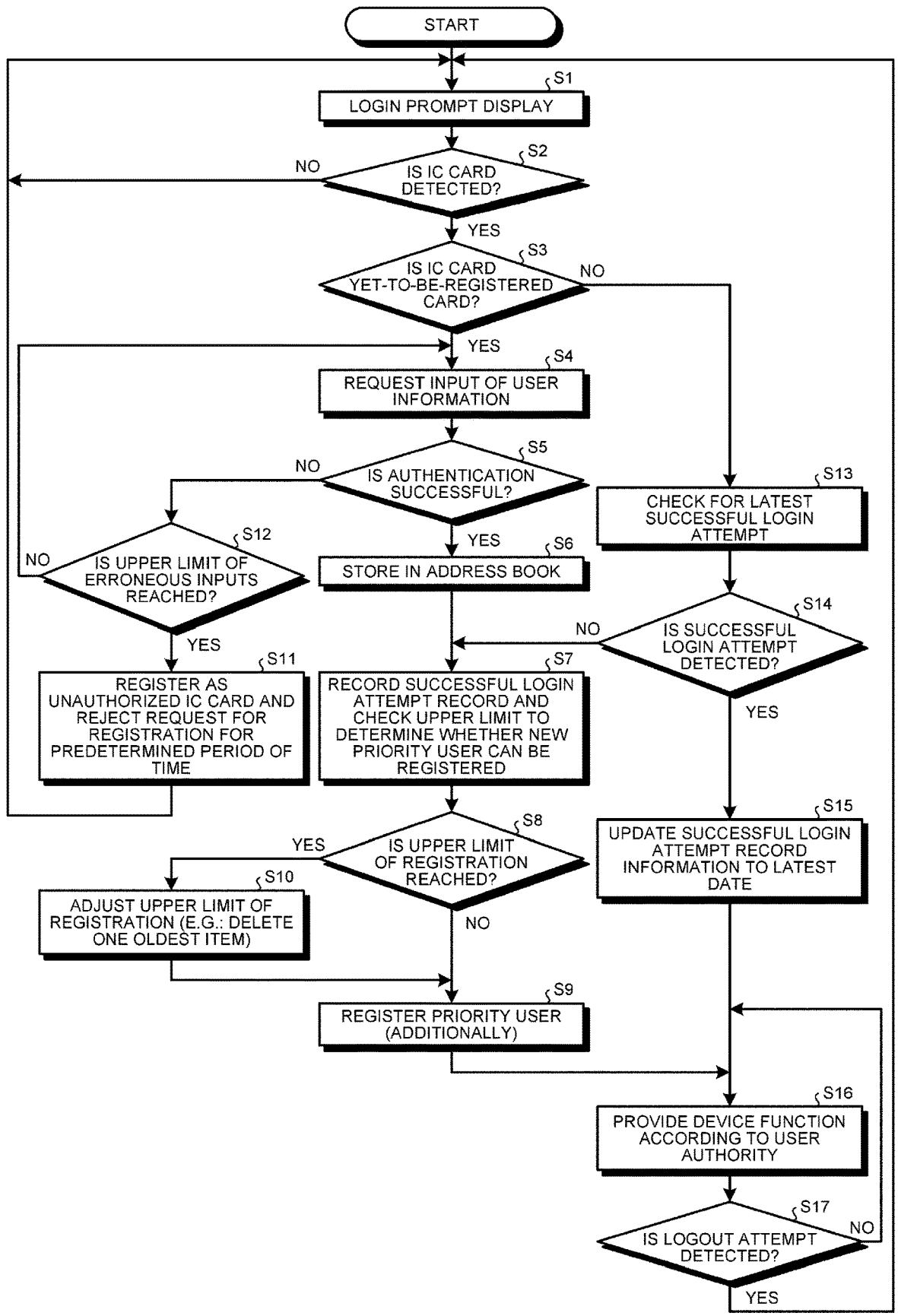

[Fig. 5]
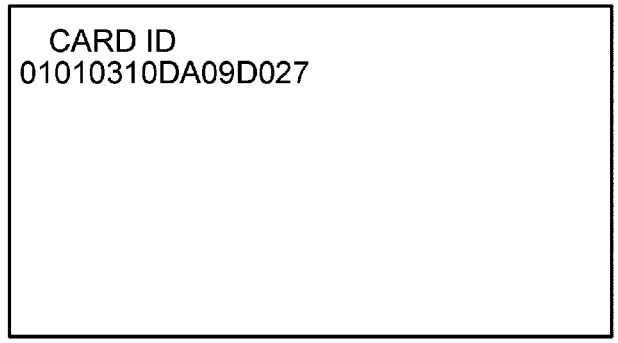
[Fig. 6]
| USER ID | CARD ID | SUCCESSFUL LOGIN TIME AND DATE |
|---|---|---|
| user015 | xxxxxxxxxxxxxxxx | 2014/9/8 14:22 |
| user033 | xxxxxxxxxxxxxxxx | 2014/9/8 18:35 |
| user001 | xxxxxxxxxxxxxxxx | 2014/9/8 11:12 |
| user007 | xxxxxxxxxxxxxxxx | 2013/9/6 15:10 |
| user012 | xxxxxxxxxxxxxxxx | 2013/9/4 13:25 |
| ⋮ | ⋮ | ⋮ |
| user026 | xxxxxxxxxxxxxxxx | 2013/3/9 17:31 |
| user008 | xxxxxxxxxxxxxxxx | 2012/8/3 10:02 |
| user003 | xxxxxxxxxxxxxxxx | 2012/8/8 14:55 |

[Fig. 7]
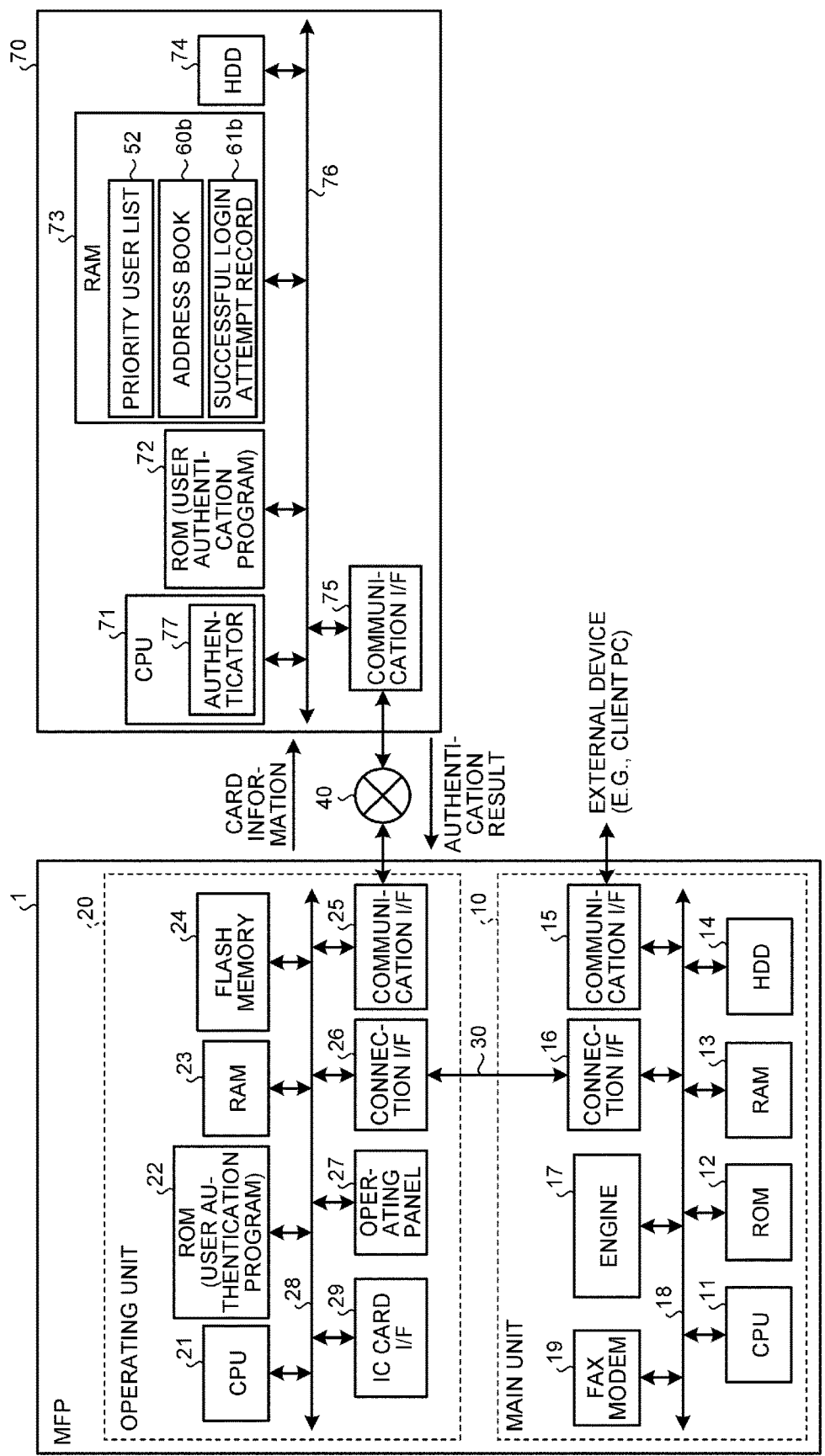

[Fig. 8]
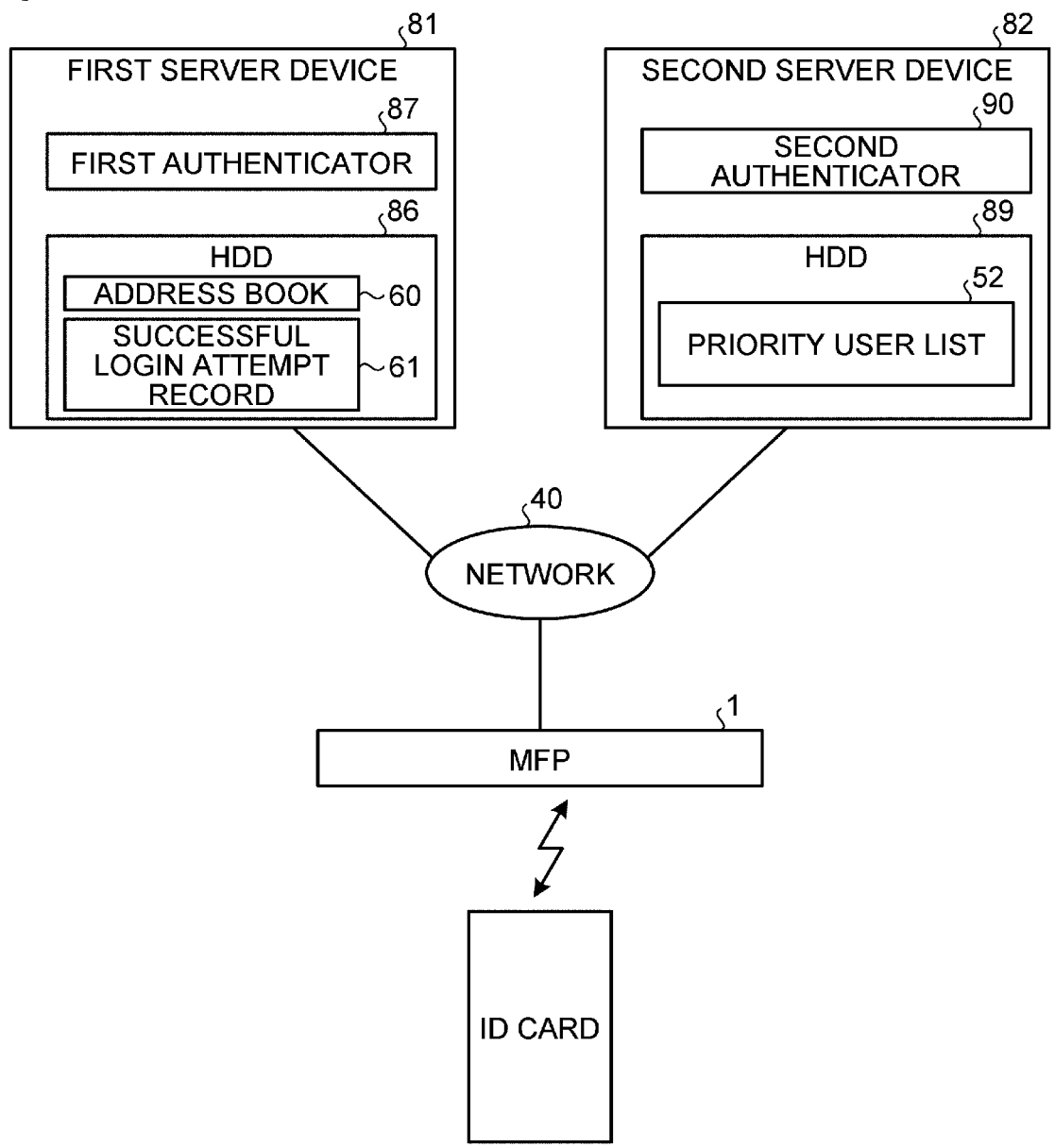

DEVICE, AUTHENTICATION PROCESSING METHOD, AND COMPUTER PROGRAM PRODUCT

TECHNICAL FIELD

The present invention relates to a device, an authentication processing method, and a computer program product.

BACKGROUND ART

In a case where a user other than a system administrator registers authentication information that includes information on an IC card used for authentication in a multifunction peripheral, the following process can be provided. When the multifunction peripheral receives a request for registering user information from a client device operated by the user, the multifunction peripheral stores the user information transmitted with the registration request.

Unfortunately, however, the above-described configuration requires a request for registering the authentication information by the user. This drawback will be commonplace in a variety of electronic devices that require user authentication.

SUMMARY OF INVENTION

Technical Problem

In view of the foregoing situation, there is a need to provide a device, an authentication processing method, and a computer program product having a computer program that eliminates complications involved in registering user authentication information and enables efficient user authentication.

Solution to Problem

According to exemplary embodiments of the present invention, there is provided a device comprising: a first unit; and a second unit, the first unit including: a function provider that provides a predetermined function; a first storage controller that stores in a first storage authentication information used for user authentication; and a provision controller that controls the function provider to provide the predetermined function when a user authentication result indicating an authorized user is obtained; and the second unit including: a first acquirer that acquires the authentication information before performance of the user authentication; a second storage controller that stores the acquired authentication information in a second storage; a first generator that generates priority user information and stores the priority user information in the second storage, the priority user information representing, of the acquired authentication information, authentication information corresponding to a user who has been authenticated in user authentication as an authorized user, to which user authentication time information is added; a second acquirer that acquires input authentication information that is input in user authentication; and an authenticator that performs user authentication by collating the input authentication information with the priority user information stored in the second storage and supplies the provision controller of the first unit with a user authentication result.

BRIEF DESCRIPTION OF DRAWINGS

FIG. 1 is a hardware configuration diagram of a MFP according to a first embodiment of the present invention.

FIG. 2 is a software configuration diagram of the MFP according to the first embodiment.

FIG. 3 is a functional block diagram of a main unit and an operating unit of the MFP according to the first embodiment.

FIG. 4 is a flowchart illustrating steps of a user authentication process performed by the MFP according to the first embodiment.

FIG. 5 is a diagram for illustrating a card ID stored in an IC card used in the MFP according to the first embodiment.

FIG. 6 is a diagram for illustrating a successful login attempt record and a priority user list used in the MFP according to the first embodiment.

FIG. 7 is a system configuration diagram of an authentication system according to a second embodiment of the present invention.

FIG. 8 is a system configuration diagram of an authentication system according to a third embodiment of the present invention.

DESCRIPTION OF EMBODIMENTS

In embodiments to which the present invention is applied, the multifunction peripheral, having received the registration request for the user information through the operating instruction from the user, receives inputs of a user name and a password. The multifunction peripheral, having determined that the user information having a set of the received user name and password had been registered in a user information control table, prepares authentication information that associates the IC card information acquired through a card reader with the user information and stores the prepared authentication information in an authentication information table. The foregoing procedure enables a user other than the system administrator to register authentication information with secured system security.

The following details, with reference to the accompanying drawings, the embodiments of the present invention.

First Embodiment

FIG. 1 is a hardware configuration diagram of a multifunction peripheral (MFP) 1 according to a first embodiment of the present invention. The MFP 1 is an exemplary device and authentication system. The MFP 1 includes a main unit 10 and an operating unit 20 as illustrated in FIG. 1. Specifically, the main unit 10 has various functions including a copier function, a scanner function, a facsimile function, and a printer function. The operating unit 20 receives inputs in accordance with user operations. The main unit 10 is an exemplary first unit and the operating unit 20 is an exemplary secondary unit.

The main unit 10 and the operating unit 20 are connected to each other via a dedicated communication path 30 so as to be capable of communicating with each other. For the communication path 30, a type that complies with, for example, the universal serial bus (USB) standard may be used. Alternatively, a type that complies with any other standard may be used regardless of whether it be wired or wireless. Additionally, the main unit 10 may have one or a plurality of functions out of image forming functions including the copier function, the scanner function, the facsimile function, and the printer function.

A stand-alone electronic device capable of performing information processing may be used for the operating unit 20. Examples of the operating unit 20 include, but are not limited to, an information processing terminal such as a smartphone and a tablet type terminal. In this case, the information processing terminal used as the operating unit 20 functions as an operating unit of the MFP 1.

More specifically, the information processing terminal used as the operating unit 20 is attachably and removably connected to the MFP 1 in place of an operating panel that has hitherto been fixedly disposed on the MFP 1 as a dedicated operating unit. Specifically, the information processing terminal used as the operating unit 20, although being removable (detachable) from a predetermined position such as a designated position at which the operating panel of the MFP 1 is to be disposed, is integrated with the MFP 1. Thus, the information processing terminal used as the operating unit 20 and the MFP 1 may be regarded as a single apparatus. The information processing terminal as the operating unit 20, when removed from the MFP 1, functions as the operating unit of the MFP 1 by performing wireless communication with the MFP 1 through, for example, Bluetooth (registered trademark) or infrared communication.

The main unit 10 operates in accordance with an input received at the operating unit 20. In addition, the main unit 10 can also communicate with an external device such as a client PC (personal computer) and operates in accordance with an instruction received from the external device.

Hardware Configuration of Main Unit

The following describes a hardware configuration of the main unit 10. As illustrated in FIG. 1, the main unit 10 includes a CPU 11, a ROM 12, a RAM 13, and a hard disk drive (HDD) 14. The main unit 10 further includes a communication interface (I/F) 15, a connection I/F 16, an engine 17, and a facsimile modem (FAX modem) 19. The elements 11 to 17 and the FAX modem 19 are connected to each other via a system bus 18.

The CPU 11 integrally controls operations of the main unit 10. The CPU 11 uses the RAM 13 as a work area to execute a program stored in, for example, the ROM 12 or the HDD 14, thereby controlling general operations of the main unit 10 and achieving the various functions including the copier function, the scanner function, the facsimile function, and the printer function mentioned previously.

The communication I/F 15 is an interface for communicating an external device such as a client personal computer (PC), a Web server device, or an authentication server device on a network 40. The connection I/F 16 is an interface for communicating with the operating unit 20 via the communication path 30. Although the communication path 30 is illustrated as being wired in FIGS. 1 and 2, the operating unit 20 is attachable and removable with respect to the main unit 10 of the MFP 1 as described previously. As a result, the communication path 30 may alternatively be something that functions as a wired communication path when the operating unit 20 is mounted on the MFP 1 and as a wireless communication path when the operating unit 20 is removed from the MFP 1.

The engine 17 is hardware that performs general-purpose information processing and other types of processing excluding communication for achieving the copier function, the scanner function, the facsimile function, and the printer function. The engine 17 includes, for example, a scanner (image reader) that scans to read an image of a document, a plotter (image generator) that performs printing on a sheet material such as paper, and a facsimile communicator that performs facsimile communication. The engine 17 may even be configured with a specific option such as a finisher that sorts printed sheet materials and an automatic document feeding device (ADF) that automatically feeds documents.

The HDD 14 has storage spaces storing an address book and successful login attempt record information, respectively. The storage space for the address book stores therein, for each user, master information that is generated by associating therewith user identification information (user ID) of a user who is authorized to use the MFP 1, and a card ID and a password of an IC card lent (issued) to the user, for example. The storage space for the successful login attempt record stores therein time and date on which an operation of the MFP 1 is permitted as a result of a login attempt, associated with a card ID of an IC card used for the login attempt and a user ID of a user corresponding to the card ID, and the like. The master information and the like may be stored in a recording medium such as an SD card (registered trademark) and a USB memory. USB is an acronym for "universal serial bus".

The embodiment has been described for an exemplary case of user authentication using the IC card. The same function as when the IC card is used can nonetheless be achieved in an arrangement in which a smartphone, a portable telephone, or any other information terminal that has a function used for user authentication (or in which an application has previously been installed) is used as an authentication device. Additionally, the embodiment will hereunder be described as using the "IC card" for user authentication. Any type of storage medium that can store user information may nonetheless be used. Thus, the IC card, an ID card, or the like is not the only possible storage medium.

Hardware Configuration of Operating Unit

The following describes a hardware configuration of the operating unit 20. As illustrated in FIG. 1, the operating unit 20 includes a CPU 21, a ROM 22, a RAM 23, a flash memory 24, a communication I/F 25, a connection I/F 26, an operating panel 27, and an IC card I/F 29. These elements are connected to each other via a system bus 28.

The CPU 21 integrally controls operations of the main operating unit 20. The CPU 21 uses the RAM 13 as a work area to execute a program stored in, for example, the ROM 22, thereby controlling general operations of the operating unit 20. In addition, the CPU 21 executes, as will be described later, a user authentication program stored in, for example, the ROM 22 to thereby achieve a user authentication operation to be described later.

The communication I/F 25 is, for example, an interface for communicating with an authentication server device on the network 40. The connection I/F 26 is an interface for communicating with the main unit 10 via the communication path 30. The IC card I/F 29 is a card reader that reads information stored in the IC card through noncontact wireless communication. The IC card I/F 29 performs noncontact wireless communication with the IC card held up by the user during a login attempt made with respect to the MFP 1, thereby reading the card ID and the like stored in the IC card.

The RAM 23 (or the flash memory 24 or any other storage) has a storage space for storing each of an address book, a successful login attempt record, and a priority user list. The storage space for the address book stores the master information of the address book acquired from the HDD 14 of the main unit 10. It is noted that the master information acquired from the main unit 10 may be stored in a recording medium such as an SD card (registered trademark) and a USB memory. The storage space for the successful login attempt record in the RAM 23 stores the successful login attempt record acquired from the HDD 14 of the main unit 10.

The storage space for the priority user list of the successful login attempt record in the RAM 23 stores, out of the successful login attempt record acquired from the HDD 14, a predetermined number of pieces of successful login attempt record information that includes the user ID, the card ID, and the login time and date in order of the login time and date. The priority user list represents a list of users subject to user authentication.

The "priority user" refers to a user corresponding to the successful login attempt record acquired from the HDD 14 of the main unit 10. Specifically, as will be described later, the MFP 1 in the present embodiment acquires the successful login attempt record for a predetermined number of latest users out of the successful login attempt record stored in the HDD 14 of the main unit 10. Each of users corresponding to the predetermined number of users on the successful login attempt record can complete his or her user authentication for use of the functions of the MFP 1 by simply holding up the IC card. The users corresponding to the successful login attempt record acquired from the HDD 14 will thus be referred to as "priority users" in the MFP 1 of the present embodiment because they can preferentially use the functions of the MFP 1.

When the card ID read from the IC card during the login attempt has been registered in the priority user list, the CPU 21 of the operating unit 20 performs user authentication for an authorized user and enables use of the functions of the MFP 1 corresponding to user authority. This arrangement allows the user authentication procedure to be completed within a period of several msec after the holding up of the IC card during the login attempt, thereby enabling the use of the MFP 1.

The operating panel 27 includes a liquid crystal display device (LCD) including a touch sensor. The operating panel 27 receives various inputs in accordance with an operation by the user. The operating panel 27 further displays various types of information including, for example, information corresponding to the received input, information indicating an operating status of the MFP 1, and information indicating a setting condition. It is noted that the operating panel 27 may include an organic EL display device including a touch sensor. Additionally, the operating panel 27 may include, in addition to or in place of the foregoing, a hardware key or other operating unit or a light-emitting or other display unit.

Software Configuration of MFP

FIG. 2 illustrates an exemplary software configuration of the MFP 1. As illustrated in FIG. 2, the main unit 10 includes an application layer 101, a service layer 102, and an OS layer 103. The application layer 101, the service layer 102, and the OS layer 103 are, in reality, various types of software stored in, for example, the ROM 12 or the HDD 14. The CPU 11 executes these pieces of software to thereby provide respective functions.

The application layer 101 software is application software (may be referred to simply as an "application" in the following) for operating hardware resources to thereby provide certain functions. Examples of the applications include, but are not limited to, a copier application for providing the copier function, a scanner application for providing the scanner function, a facsimile application for providing the facsimile function, and a printer application for providing the printer function.

The service layer 102 software is disposed between the application layer 101 and the OS layer 103 and provides an application with an interface for using a hardware resource of the main unit 10. Specifically, the service layer 102 software receives an operation request with respect to a hardware resource and provides a function of reconciling operation requests. Examples of the operation requests received by the service layer 102 include, but are not limited to, reading by the scanner and printing by the plotter.

The interface function by the service layer 102 is provided for not only the application layer 101 of the main unit 10, but also an application layer 201 of the operating unit 20. The application layer 201 (application) of the operating unit 20 can also achieve a function that uses the hardware resources (e.g., the engine 17) of the main unit 10 via the interface function provided by the service layer 102.

The OS layer 103 software is basic software (operating system) for providing a basic function of controlling the hardware of the main unit 10. The service layer 102 software converts a request for using a hardware resource from each of different applications to a command that can be interpreted by the OS layer 103 and passes the resultant command to the OS layer 103. The OS layer 103 software then executes the command, so that the hardware resource can operate in accordance with the request from the application.

Similarly, the operating unit 20 includes the application layer 201, a service layer 202, and an OS layer 203. The application layer 201, the service layer 202, and the OS layer 203 of the operating unit 20 have a hierarchical structure similar to a hierarchical structure of the main unit 10. Functions provided by the applications of the application layer 201 and types of operation requests to be received by the service layer 202, however, differ from those on the main unit 10 side. The applications of the application layer 201 are software for operating the hardware resources of the operating unit 20. The software chiefly provides a user interface (UI) function for operating and displaying the functions (the copier function, the scanner function, the facsimile function, and the printer function) of the main unit 10.

It is noted that, in the example of the present embodiment, the OS layer 103 software on the main unit 10 side differs from the OS layer 203 software on the operating unit 20 side with the aim of maintaining independence of the function. Specifically, the main unit 10 and the operating unit 20 operate on their respective operating systems independently of each other. For example, Linux (registered trademark) may be used as the OS layer 103 software on the main unit 10 side and Android (registered trademark) may be used as the OS layer 203 software on the operating unit 20 side.

Causing the main unit 10 and the operating unit 20 to operate on their respective operating systems results in communication between the main unit 10 and the operating unit 20 being performed, not as communication between processes within a common device, but as communication between different devices. This communication corresponds, for example, to an operation (command communication) of transmitting an input (instruction from the user) received by the operating unit 20 to the main unit 10 and an operation of notifying of an event by the main unit 10 to the operating unit 20. The command communication performed by the operating unit 20 with the main unit 10 enables use of the function of the main unit 10. Examples of the event to be notified to the operating unit 20 by the main unit 10 include, but are not limited to, an operation executing status in the main unit 10 and details of setting made on the main unit 10 side.

Additionally, in the example of the present embodiment, power is supplied to the operating unit 20 from the main unit 10 by way of the communication path 30. This configuration allows power supply control for the operating unit 20 to be performed independently of the power supply control for the main unit 10.

While the main unit 10 and the operating unit 20 are electrically and physically connected to each other via the communication path 30 in this example, the operating unit 20 can be removed from the main unit 10 as described previously. In this case, the main unit 10 and the operating unit 20 are provided with a short-range wireless communicator such as, for example, an infrared communicator, a RF communicator, and a Bluetooth (registered trademark) communicator. RF is an acronym for "radio frequency". Alternatively, the main unit 10 and the operating unit 20 may be provided with a wireless LAN communication function such as Wi-Fi (registered trademark) so as to be capable of communicating with each other via a wireless LAN access point (wireless LAN AP) 41 and the network 40 as illustrated in FIG. 2. LAN is an acronym for "local area network". With a configuration of the operating unit 20 being removable from the main unit 10, the operating unit 20 stores electric power supplied from the main unit 10 via the communication path 30 in a secondary battery. The operating unit 20, when removed from the main unit 10, communicates with the main unit 10 as being energized by the electric power stored in the secondary battery.

Functions of Operating Unit

FIG. 3 is a functional block diagram of the main unit 10 and the operating unit 20 of the MFP 1. In FIG. 3, the RAM 23 of the operating unit 20 stores an address book 60b and a successful login attempt record 61b that are transferred from the main unit 10 side and a priority user list 52 that represents a list formulated from priority user information generated from the successful login attempt record 61b. The ROM 22 stores a user authentication program 51 that achieves user authentication. The CPU 21 of the operating unit 20 operates in accordance with the user authentication program 51 to thereby function as a first authentication module 53, a priority user administration module 54, and an IC card control module 55. The first authentication module 53 is exemplary authenticator and registration determiner. The priority user administration module 54 is exemplary first acquirer, second storage controller, and first generator. The RAM 23 is an exemplary second storage. The IC card control module 55 is an exemplary second acquirer.

The first authentication module 53 collates the card ID read from the user's IC card during the login attempt with the address book 60b stored in the RAM 23. When the card ID is stored in the address book 60b, the first authentication module 53 performs a user authentication process. When the card ID is not stored in the address book 60b, the first authentication module 53 recognizes the IC card as an IC card that is yet to be registered and is used by a user-authenticated user and performs a process of registering a new IC card.

The priority user administration module 54 controls acquisition and updating of an address book 60a and a successful login attempt record 61a from the main unit 10. The priority user administration module 54 also controls generation and updating of the priority user list 52. The IC card control module 55 controls noncontact wireless communication performed with the IC card via the IC card I/F 29.

It is noted that the user can manually register a user subject to user authentication in the priority user list 52. When a user subject to user authentication is to be manually registered, the priority user administration module 54 stores a card ID, a user ID, and a password that have been manually input of the user subject to user authentication in the address book 60a of the HDD 14 of the main unit 10. In addition, the priority user administration module 54 registers the manually input card ID and user ID of the user subject to user authentication and time and date of the input as successful login attempt time and date information in the priority user list 52.

The current example is described on the assumption that the elements from the first authentication module 53 to the IC card control module 55 are achieved by software using the user authentication program 51. Nonetheless, the elements from the first authentication module 53 to the IC card control module 55 may be achieved, in part or in whole, by hardware such as an integrated circuit (IC).

In addition, the user authentication program 51 may be provided by being recorded on a non-transitory computer-readable recording medium such as a CD-ROM and a flexible disk (FD) in a file in an installable format or an executable format. The user authentication program 51 may be provided by being recorded on a non-transitory computer-readable recording medium such as a CD-R, a DVD, a Blu-ray disc (registered trademark), and a semiconductor memory. DVD is an acronym for "digital versatile disk". The user authentication program 51 may still be provided by being installed over a network such as the Internet. The user authentication program 51 may even be provided by being incorporated in, for example, the ROM of the device in advance.

Functions of Main Unit

Reference is made again to FIG. 3. The HDD 14 of the main unit 10 stores a copier application 56, a FAX application 57, a scanner application 58, an SDK application 59, and various other types of application programs. The copier application 56 is an application program for causing the CPU 11 to control a scanner engine and a plotter engine of the engine 17 to thereby achieve the copier function. The FAX application 57 is an application program for causing the CPU 11 to control the FAX modem 19 to thereby achieve the facsimile function.

The scanner application 58 is an application program for causing the CPU 11 to control the scanner engine of the engine 17 to thereby achieve the scanner function. The SDK application 59 is a package of programs, documents, and the like required for development of software for the MFP 1. SDK is an acronym for "software development kit".

The CPU 11 of the main unit 10 functions as a second authentication module 62 and a user administration module 63 in accordance with a user authentication program (not illustrated) on the main unit 10 side. The user administration module 63 controls writing and reading of the master information to and from the address book 60a of the HDD 14. The user administration module 63 is an exemplary first storage controller. The HDD 14 is an exemplary first storage. The address book 60a is exemplary authentication information used for user authentication. In addition, the user administration module 63 controls writing and reading of the successful login attempt record information to and from the successful login attempt record 61a. The user administration module 63 also controls transfer of the address book 60a and the successful login attempt record 61a to the operating unit 20. The second authentication module 62 performs a user authentication process on the basis of the master information stored in the address book 60a for a user for whom the operating unit 20 cannot perform user authentication.

The current example is described on the assumption that the second authentication module 62 and the user administration module 63 are achieved by software using the user authentication program on the main unit 10 side. Nonetheless, either one or both of the second authentication module 62 and the user administration module 63 may be achieved by hardware such as an integrated circuit (IC).

Additionally, the user authentication program on the main unit 10 side may be provided by being recorded on a non-transitory computer-readable recording medium such as a CD-ROM and a flexible disk (FD) in a file in an installable format or an executable format. The user authentication program on the main unit 10 side may be provided by being recorded on a non-transitory computer-readable recording medium such as a CD-R, a DVD, a Blu-ray disc (registered trademark), and a semiconductor memory. DVD is an acronym for "digital versatile disk". The user authentication program on the main unit 10 side may still be provided by being installed over a network such as the Internet. The user authentication program on the main unit 10 side may even be provided by being incorporated in, for example, the ROM of the device in advance.

User Authentication Operation

The following describes, with reference to a flowchart illustrated in FIG. 4, the user authentication process performed by the MFP 1 in the present embodiment. The following prerequisites apply before the user authentication process illustrated in FIG. 4 is performed. Specifically, the priority user administration module 54 of the operating unit 20 acquires the address book 60a and the successful login attempt record 61a stored in the HDD 14 of the main unit 10 when, for example, the MFP 1 is started (when main power is turned ON), or at a timing immediately before a shift to a power save mode, or at predetermined time intervals, to thereby perform storage control with respect to the RAM 23. It is noted that the address book 60b is a duplicate of the address book 60a stored on the main unit 10 side. Similarly, the successful login attempt record 61b is a duplicate of the successful login attempt record 61a stored on the main unit 10 side. Additionally, the priority user administration module 54 acquires from the successful login attempt record 61b the successful login attempt record information for each of a predetermined number of users counted from the user of the latest login time and date and stores the successful login attempt record information as information on the users subject to user authentication in the priority user list 52 of the RAM 23. The foregoing prerequisites enable the user authentication process illustrated in the flowchart of FIG. 4 to be performed.

At Step S1 of the flowchart illustrated in FIG. 4, the CPU 21 of the operating unit 20 displays on the operating panel 27 a prompt message that requests performance of a login attempt with respect to the MFP 1. The message may read, for example, "Please log in". The user who wants to use the function of the MFP 1 brings his or her IC card close to the IC card I/F 29 over a distance that enables noncontact wireless communication between the IC card and the IC card I/F 29. This step initiates the noncontact wireless communication between the IC card and the IC card I/F 29.

At Step S2, the IC card control module 55 monitors whether the noncontact wireless communication has been initiated between the IC card and the IC card I/F 29. Upon detection of the initiation of the noncontact wireless communication between the IC card and the IC card I/F 29, the IC card control module 55 determines that the IC card I/F 29 has detected the IC card (Yes at Step S2) and causes the process to proceed to Step S3. It is noted that the IC card control module 55, until it detects the initiation of the noncontact wireless communication between the IC card and the IC card I/F 29 (No at Step S2), continues displaying the login attempt prompt message at Step S1.

The IC card stores unique identification information (card ID) as illustrated, for example, in FIG. 5. FIG. 5 illustrates an example of an IC card that stores a card ID of "01010310A09D027". When the noncontact wireless communication with the IC card is enabled, the IC card control module 55 controls the IC card I/F 29 to read the unique identification information (card ID) assigned to the IC card as in the example illustrated in FIG. 5.

The current example has been described to read the card ID from the IC card. The IC card control module 55 may also read other pieces of information that may be stored in the IC card, such as the user ID, together with the card ID, for use in the user authentication to be described hereunder.

At Step S3, the first authentication module 53 collates the read card ID with each piece of master information of the address book 60b duplicated in the RAM 23. The first authentication module 53 thereby determines whether the read card ID is registered in the address book 60b.

The card ID read from the IC card being registered in the address book 60b means that the IC card that is currently used by the user has been registered in the address book 60a and the address book 60b. In this case, the first authentication module 53 determines that the IC card is not a yet-to-be-registered card (has been registered) (No at Step S3) and causes the process to proceed to Step S13. In contrast, the card ID read from the IC card being not registered in the address book 60b means that the IC card that is currently used by the user is a new IC card which is yet to be registered in the address book 60a and the address book 60b. In this case, the first authentication module 53 determines that the IC card is a yet-to-be-registered card (has not been registered) (Yes at Step S3) and causes the process to proceed to Step S4.

The steps from Step S13 through Step S17 in the flowchart of FIG. 4 represent the user authentication process. The steps from Step S4 through Step S12 represent a new IC card registration process. When the card ID read from the IC card has been registered in the address book 60b, the user authentication process from Step S13 through Step S17 is performed. When the card ID read from the IC card is not registered in the address book 60b, the new IC card registration process from Step S4 through Step S12 is performed.

New IC Card Registration Process

A shift to the new IC card registration process as a result of the card ID read from the IC card not being registered in the address book 60b causes the first authentication module 53 to display on, for example, the operating panel 27 an input screen for a user ID and a password at Step S4. The first authentication module 53 prompts the user who uses the IC card having the card ID not registered to input the user ID and the password. The user operates the operating panel 27 to input in the input screen the user ID and the password used for the registration of another IC card.

Specifically, the MFP 1 in the present embodiment authorizes only authorized users to use the MFP 1. Thus, an authorized user is supposed to have his or her master information that includes a previously registered card ID, a user ID, and a password registered in the address book 60b (and the address book 60a). Additionally, if an authorized user uses a new IC card, the card ID read from the new IC card is not supposed to have been registered in the address book 60b. The foregoing assumptions cause the first authentication module 53 to request the user to input the user ID and the password at Step S4, if the card ID read from the IC card is not registered in the address book 60b.

The first authentication module 53 next collates the user ID and the password input by the user with the master information of each user in the address book 60b. The user ID and the password input by the user being registered in the address book 60b means that this particular user is an authorized user who previously registered using a different IC card in the past. In this case, the first authentication module 53 determines at Step S5 that the authentication has been successful (Yes at Step S5) and the process proceeds to Step S6.

In contrast, if the user ID and the password input by the user are not registered in the address book 60b, this particular user is highly likely to be an unauthorized user, although he or she may have input a wrong user ID or/and a wrong password. In this case, the first authentication module 53 determines that the authentication has been unsuccessful (No at Step S5). The process then proceeds to Step S12 and the user is requested to re-input the user ID and the password. The user re-inputs the user ID and the password. Each time the user re-inputs the user ID and the password, the first authentication module 53 collates the user ID and the password with the address book 60b to thereby determine whether the authentication has been successful. The first authentication module 53 also counts an input of a wrong user ID or a wrong password. When the first authentication module 53 counts a predetermined number of inputs of a wrong user ID or a wrong password, for example, three (Yes at Step S12 when an upper limit of erroneous inputs is reached), the process proceeds to Step S11. At Step S11, the first authentication module 53 registers the card ID as the card ID of an unauthorized IC card in the RAM 23 and transfers the card ID to the user administration module 63 of the main unit 10. The user administration module 63 of the main unit 10 registers the transferred card ID as the card ID of an unauthorized IC card in the HDD 14.

The user ID and the password input by the user being registered in the address book 60b means that the user who has input the user ID and the password is an authorized user and the currently used IC card is a new IC card (IC card yet to be registered). In this case, the process proceeds to Step S6 and the priority user administration module 54 as an exemplary second generator registers new master information that is associated with the user ID and the password input by the user in the address book 60b. The process then proceeds to Step S7. The priority user administration module 54 also transfers the new master information to the user administration module 63 of the main unit 10. The user administration module 63 of the main unit 10 registers the new master information in the address book 60a.

At Step S7, the priority user administration module 54 generates successful login attempt record information that associates the card ID of the new IC card and the user ID input by the user with the successful login attempt time and date information that indicates the current time-of-day and date. The user administration module 63 then registers the successful login attempt record information as the successful login attempt record information as of the latest date in the successful login attempt record 61b. Additionally, the priority user administration module 54 transfers the successful login attempt record information as of the latest date to the user administration module 63 of the main unit 10. The user administration module 63 registers the transferred successful login attempt record information as of the latest date in the successful login attempt record 61a.

FIG. 6 is a schematic diagram of the successful login attempt record 61b (and the successful login attempt record 61a). As illustrated in FIG. 6, the user ID and the card ID are associated with the successful login attempt time and date and registered in the successful login attempt record 61 in reverse chronological order. The example illustrated in FIG. 6 indicates that the latest successful login attempt time and date was "14:22, September 8, 2014" and the login attempt was made by the user having a user ID of "user015" and a card ID of "xxxxxxxxxxxxxxxx". The example illustrated in FIG. 6 further indicates that the second latest successful login attempt time and date was "18:35, September 7, 2014" and the login attempt was made by the user having a user ID of "user033" and a card ID of "xxxxxxxxxxxxxxxx". The example illustrated in FIG. 6 further indicates that the third latest successful login attempt time and date was "11:12, September 7, 2014" and the login attempt was made by the user having a user ID of "user001" and a card ID of "xxxxxxxxxxxxxxxx".

Of the successful login attempt record information registered in the successful login attempt record 61b, pieces of successful login attempt record information corresponding to a predetermined number of users are registered as the priority user list 52 in the RAM 23. Specifically, the priority user list 52 has a limited number of users defined to be registered, e.g., 300 users. When, for example, the MFP 1 is started (when the main power is turned ON), or at a timing immediately before a shift to the power save mode, or at predetermined time intervals, the successful login attempt record information for 300 users counted from the user of the latest login time and date is read from the successful login attempt record 61b and registered in the priority user list 52. If the current number of users of the successful login attempt record information registered in the successful login attempt record 61b falls short of the upper limit of registration, e.g., 150 users, the successful login attempt record information for the 150 users currently registered in the successful login attempt record 61b is registered in the priority user list 52.

As such, the priority user list 52 has a defined upper limit of registration. When the new successful login attempt record information has been registered in the successful login attempt record 61b, the priority user list 52 needs to be updated to incorporate therein the new successful login attempt record information. Thus, the priority user administration module 54 determines at Step S7 whether the number of pieces of successful login attempt record information registered in the priority user list 52 reaches the upper limit (the 300 users). If it is determined that the number of pieces of successful login attempt record information registered in the priority user list 52 is yet to reach the upper limit (No at Step S8), the process proceeds to Step S9.

If it is determined that the number of pieces of successful login attempt record information registered in the priority user list 52 has reached the upper limit (Yes at Step S8), the process proceeds to Step S10. At Step S10, the priority user administration module 54 deletes, for example, a specific piece of successful login attempt record information having the oldest successful login attempt time and date from the priority user list 52 and the process proceeds to Step S9. For example, in the example illustrated in FIG. 6, the successful login attempt record information of the user identified by "user003" is deleted.

In the current example, when it is determined that the number of pieces of successful login attempt record information registered in the priority user list 52 has reached the upper limit, the specific piece of successful login attempt record information having the oldest successful login attempt time and date is deleted from the priority user list 52 and a new piece of successful login attempt record information is registered in the priority user list 52. Alternatively, however, when it is determined that the number of pieces of successful login attempt record information registered in the priority user list 52 has reached the upper limit, the successful login attempt record information for a plurality of users, e.g., ten users, counted from the user of the oldest login time and date may be deleted and, thereafter, new pieces of successful login attempt record information may be registered in the priority user list 52 until the upper limit of registration is reached.

Alternatively, login frequency (frequency of use of the MFP 1), a group to which the user belongs, rank of the user, and the like may be registered, in addition to the card ID, the user ID, and the successful login attempt record, in the priority user list 52. Items to be deleted may then be automatically selected on the basis of these pieces of registered information.

Alternatively, the upper limit of registration with respect to the priority user list 52 may be arranged to be automatically or manually added, for example, "change 300 users to 310 users".

Alternatively, the priority user list 52 may be stored in a recording medium, such as a semiconductor memory card or a magnetic card, so that the priority user list 52 can be used in a device such as another MFP 1.

At Step S9, the priority user administration module 54 registers in the priority user list 52 the successful login attempt record information that has newly been registered in the successful login attempt record 61b as the latest successful login attempt record information. In the example illustrated in FIG. 6, the latest successful login attempt record information is registered in a position above "user015" (at the start of the priority user list 52).

The process thereafter proceeds to Step S16 and the CPU 11 of the main unit 10 controls the engine 17 to provide a function according to the user authority. The CPU 11 of the main unit 10 controls to provide certain functions at Step S16 until a logout attempt by the user or a timeout event is detected at Step S17.

User Authentication Process

When the card ID read from the IC card has been registered in the address book 60b, the process shifts to the user authentication process from Step S13 to Step S17. At Step S13, the first authentication module 53 collates the card ID read from the IC card with the priority user list 52. The first authentication module 53 then determines at Step S14 whether the successful login attempt record information that corresponds to the card ID is registered in the priority user list 52.

If the successful login attempt record information that corresponds to the card ID cannot be detected in the priority user list 52, the process proceeds to Step S7. At Step S7, the priority user administration module 54 associates the card ID read from the IC card with the user ID associated with the card ID and the successful login attempt record information that indicates the current time-of-day and date to thereby generate new successful login attempt record information and registers the new successful login attempt record information in the successful login attempt record 61b. Additionally, the priority user administration module 54 transfers the generated new successful login attempt record information to the user administration module 63 of the main unit 10. The user administration module 63 of the main unit 10 updates the successful login attempt record 61a of the HDD 14 with the transferred new successful login attempt record information.

The priority user administration module 54 determines, at Step S7 and Step S8, whether the number of pieces of successful login attempt record information registered in the priority user list 52 has reached its upper limit. If the upper limit of registration has been reached, the priority user administration module 54 deletes a predetermined number of pieces of successful login attempt record information at Step S10. Then at Step S9, the priority user administration module 54 registers a new piece of successful login attempt record information in the priority user list 52.

The process thereafter proceeds to Step S16 and the CPU 11 of the main unit 10 controls the engine 17 to provide a function according to the user authority. The CPU 11 of the main unit 10 controls to provide certain functions at Step S16 until a logout attempt by the user or a timeout event is detected at Step S17.

If the successful login attempt record information that corresponds to the card ID can be detected in the priority user list 52 (Yes at Step S14), the process proceeds to Step S15. At Step S15, the priority user administration module 54 updates the successful login attempt time and date information of the successful login attempt record information that corresponds to the card ID detected from the priority user list 52 to the current date. This updating causes the successful login attempt record information of the IC card that is currently used by the user to be registered as the latest successful login attempt record information in the priority user list 52. The priority user administration module 54, upon completion of this updating of the priority user list 52, updates the successful login attempt record 61b with the latest successful login attempt record information and transfers the latest successful login attempt record information to the user administration module 63 on the main unit 10 side. The user administration module 63 updates the successful login attempt record 61a of the HDD 14 with the transferred latest successful login attempt record information.

When the priority user list 52 has been updated, the process proceeds to Step S16. The CPU 11 of the main unit 10 controls the engine 17 to provide a function according to the user authority. The CPU 11 of the main unit 10 controls to provide certain functions at Step S16 until a logout attempt by the user or a timeout event is detected at Step S17.

Effects of First Embodiment

In summary, the MFP 1 in the first embodiment stores in advance the master information of each user, including a user ID, a password, and a card ID, in the address books (60a, 60b). When a user uses a new card, the MFP 1 requests the user to input his or her user ID and password. The MFP 1 collates the user ID and the password input by the user with the corresponding master information in the address book to thereby perform user authentication. When the user is authenticated to be an authorized user, the MFP 1 generates new master information that includes the card ID of the new card and the user ID and the password input by the user and registers the new master information in the address book.

The foregoing steps enable, when the new card is used, the master information including the card ID of the new card to be registered substantially automatically. This procedure eliminates troublesome steps to be performed by an administrator to manually register the master information of each user. Workload can thereby be reduced in registering and managing the master information of each user for a customer who opts not to have or does not have an administrator.

Each time a login attempt by an authorized user has been successful, the MFP 1 stores in the RAM 23 of the operating unit 20 the successful login attempt record information that associates the card ID with the successful login attempt time and date information that indicates the time-of-day and date when the login attempt was successful as the priority user list 52. At the time of the login attempt, the MFP 1 collates the card ID of the IC card used by the user with the priority user list 52. When the successful login attempt record information that includes the card ID of the IC card used by the user can be detected in the priority user list 52, the MFP 1 authenticates the user of the card ID as an authorized user and enables the user to use the MFP 1.

The foregoing arrangements enable the user who succeeded in a login attempt in the past (the user for whom the successful login attempt record information is registered in the priority user list 52) to complete the user authentication procedure and to use the MFP 1 by simply bringing the IC card close to the IC card I/F 29.

Second Embodiment

The following describes an authentication system according to a second embodiment of the present invention. The authentication system according to the second embodiment causes an authentication server device disposed on a network to perform the user authentication process.

Configuration of Authentication System of Second Embodiment

FIG. 7 illustrates a system configuration of the authentication system according to the second embodiment. In FIG. 7, like elements that exhibit like operations as in the first embodiment described above are identified by like reference numerals. For detailed descriptions of these operations, refer to the descriptions of the first embodiment. Reference is made to FIG. 7. The authentication system according to the second embodiment is configured as follows. Specifically, a communication I/F 25 of an operating unit 20 of a MFP 1 is connected to a network 40 such as the Internet and a communication I/F 75 of an authentication server device 70 is connected to the network 40. The MFP 1 and the authentication server device 70 are thereby connected to each other over the network 40 to thus configure the authentication system in the second embodiment. The MFP 1 is an exemplary device. The authentication server device 70 is an exemplary authentication server device. The communication I/F 25 is an exemplary transmitter. The communication I/F 75 is an exemplary input acquirer and an exemplary authentication result transmitter.

The authentication server device 70 includes a CPU 71, a ROM 72, a RAM 73, a HDD 74, and the communication I/F 75 that are connected to each other via a bus line 76. The ROM 72 stores a user authentication program for executing the user authentication process. The CPU 71 operates in accordance with the user authentication program to function as an authenticator 77 that corresponds to the first authentication module 53 described previously as well as the priority user administration module 54 (see FIG. 3) described previously. The priority user administration module 54 is an exemplary second storage controller and an exemplary first generator. The authenticator 77 is an exemplary authenticator.

The RAM 73 stores an address book 60b and a successful login attempt record 61b that are transmitted in advance from the operating unit 20 of the MFP 1. The CPU 71 stores, as a priority user list 52, the successful login attempt record information for a predetermined number of users extracted from the latest successful login attempt record information out of the successful login attempt record 61b in the RAM 73.

Operation of Authentication System of Second Embodiment

In the authentication system as described above, a CPU 21 of the operating unit 20 of the MFP 1 transmits the address book 60b that stores the master information of each user to the authentication server device 70 in advance. The CPU 71 of the authentication server device 70 stores the transmitted address book 60b in the RAM 73. Additionally, the CPU 21 of the operating unit 20 of the MFP 1 transmits the card ID read by an IC card I/F 29 from the IC card of the user during the login attempt to the authentication server device 70. The authenticator 77 of the authentication server device 70 performs user authentication by collating the card ID transmitted from the MFP 1 with the address book 60b stored in the RAM 73. The CPU 71 generates successful login attempt record information that associates the user ID of the user who has succeeded in the user authentication and the card ID with the latest successful login attempt time and date information and stores the successful login attempt record information as the successful login attempt record 61b in the RAM 73. Furthermore, the authenticator 77 of the authentication server device 70 stores, as the priority user list 52, the successful login attempt record information for a predetermined number of users extracted from the latest successful login attempt record information in the RAM 73. The foregoing steps enable the user authentication process.

Specifically, the operating unit 20 of the MFP 1 transmits the card ID read by the IC card I/F 29 during the login attempt to the authentication server device 70. The authenticator 77 of the authentication server device 70 collates the card ID transmitted from the MFP 1 side with the priority user list 52. If the card ID transmitted from the MFP 1 side exists in any piece of the successful login attempt record information of the priority user list 52, the authenticator 77 authenticates the user of the card ID transmitted from the MFP 1 side as an authorized user. This authentication result is transmitted to the operating unit 20 of the MFP 1 via the network 40. When having received from the authentication server device 70 the authentication result that indicates that the user is an authorized user, the CPU 21 of the operating unit 20 communicates with a CPU 11 of a main unit 10 to thereby enable the use of the MFP 1.

Effects of Second Embodiment

In the authentication system according to the second embodiment, the user authentication process is performed on the side of the authentication server device 70, so that load on the MFP 1 side can be reduced and similar effects as in the first embodiment can be achieved.

Third Embodiment

The following describes an authentication system according to a third embodiment of the present invention. The authentication system according to the third embodiment includes a plurality of authentication server devices disposed on a network and causes the authentication server devices to share the user authentication process.

Configuration of Authentication System of Second Embodiment

FIG. 8 illustrates a system configuration of the authentication system according to the third embodiment. In FIG. 8, like elements that exhibit like operations as in the first embodiment described above are identified by like reference numerals. For detailed descriptions of these operations, refer to the descriptions of the first embodiment. Reference is made to FIG. 8. The authentication system according to the third embodiment includes a first server device 81 that performs a registration process for a new IC card, a second server device 82 that performs user authentication, and a MFP 1. The first server device 81, the second server device 82, and the MFP 1 are connected to each other over a network 40.

The MFP 1 is an exemplary device. The first server device 81 that performs a registration process for a new IC card is an exemplary first server device. The second server device 82 that performs user authentication is an exemplary second server device. The MFP 1 has a configuration described with reference to FIG. 1. The MFP 1 includes a CPU 11 as an exemplary provision controller and an engine 17 as an exemplary function provider. In addition, as described with reference to FIG. 3, the MFP 1 includes a priority user administration module 54 as an exemplary first storage controller and an IC card control module 55 as an exemplary input acquirer. Additionally, as described with reference to FIG. 1, the MFP 1 includes a communication I/F 25 as an exemplary first transmitter and a RAM 23 as an exemplary first storage.

The first server device 81 performs the new IC card registration process that corresponds to the steps from Step S4 through Step S12 of the flowchart illustrated in FIG. 4. The first server device 81 includes a first authenticator 87 serving as a function achieved by a CPU executing the user authentication program. The first authenticator 87 is an exemplary acquirer, second storage controller, first generator, and second transmitter. The first authenticator 87 stores an address book 60 transmitted from the MFP 1 in a HDD 86. The first authenticator 87 also stores in a successful login attempt record 61 of the HDD 86 successful login attempt record information generated through collating of a card ID of an IC card transmitted from the MFP 1 during a login attempt with the address book 60.

The second server device 82 is the server that performs the user authentication process that corresponds to the steps from Step S13 through Step S17 in the flowchart of FIG. 4. The second server device 82 includes a second authenticator 90 serving as a function achieved by the CPU executing the user authentication program. The second authenticator 90 is an exemplary third storage controller, authenticator, and authentication result transmitter. The second server device 82 stores, in a priority user list 52 serving as an exemplary third storage of a HDD 89, successful login attempt record information for a predetermined number of users extracted from the latest successful login attempt record information transmitted from the first server device 81.

Operation of Authentication System in Third Embodiment

In the authentication system, a CPU 21 of an operating unit 20 of the MFP 1 transmits in advance the address book 60 that stores the master information of each user to the first server device 81. The first authenticator 87 of the first server device 81 stores the transmitted address book 60 in the HDD 86. Additionally, the CPU 21 of the operating unit 20 of the MFP 1 transmits the card ID read by an IC card I/F 29 from the IC card of the user during the login attempt to the first server device 81 and the second server device 82.

The first authenticator 87 of the first server device 81 performs user authentication by collating the card ID transmitted from the MFP 1 with the address book 60 stored in the HDD 86. The first authenticator 87 generates successful login attempt record information that associates the user ID of the user who has succeeded in the user authentication and the card ID with the successful login attempt time and date information and stores the successful login attempt record information in the successful login attempt record 61. Furthermore, the first authenticator 87 of the first server device 81 reads from the HDD 86 the successful login attempt record information for a predetermined number of users extracted from the successful login attempt record information of the latest successful login attempt time and date and transmits the successful login attempt record information for the predetermined number of users to the second server device 82 over the network 40.

If the card ID transmitted from the MFP 1 is yet to be registered in the address book 60, the first authenticator 87 of the first server device 81 requests the MFP 1 to input the user ID, the password, and other user information. The first authenticator 87 performs user authentication by collating the user information transmitted from the MFP 1 in response to the foregoing input request with the user information of the address book 60. The first authenticator 87, when having detected a plurality of times of inputs of wrong user information as a result of the user authentication, transmits an authentication result of an unauthorized user to the MFP 1.

In contrast, if the card ID transmitted from the MFP 1 has been registered in the address book 60, this signifies that an IC card having a new card ID that has not been registered in the address book 60 is being used. Thus, the first authenticator 87 registers the new card ID, user ID, and password in the address book 60. Additionally, the first authenticator 87 notifies the MFP 1 of the card IC, the user ID, and the password that have newly been registered in the address book 60. The MFP 1 updates an address book (60a) stored in a HDD 14 with the notified new card ID, user ID, and password.

Moreover, the first authenticator 87 generates the latest successful login attempt record information that associates the new card ID and user ID with the successful login attempt time and date information and registers the successful login attempt record information in the successful login attempt record 61. The first authenticator 87 reads from the HDD 86 the successful login attempt record information for a predetermined number of users extracted from the successful login attempt record information of the latest successful login attempt time and date and transmits the successful login attempt record information for the predetermined number of users to the second server device 82 over the network 40.

The second server device 82 stores the successful login attempt record information for the predetermined number of users transmitted from the first server device 81 in the priority user list 52 of the HDD 89. The second authenticator 90 of the second server device 82 collates the card ID transmitted from the MFP 1 with the priority user list 52. If the card ID transmitted from the MFP 1 side exists in any piece of the successful login attempt record information of the priority user list 52, the second authenticator 90 authenticates the user of the card ID transmitted from the MFP 1 side as an authorized user. This authentication result is transmitted to the operating unit 20 of the MFP 1 via the network 40. When having received from the second server device 82 the authentication result that indicates that the user is an authorized user, the CPU 21 of the operating unit 20 communicates with the CPU 11 of a main unit 10 to thereby enable the use of the MFP 1.

Effects of Third Embodiment

In the authentication system according to the third embodiment, the user authentication process is shared between the first server device 81 and the second server device 82, so that load required for the user authentication process on the MFP 1, the first server device 81, and the second server device 82 can be considerably reduced and similar effects as in the first embodiment can be achieved.

The above-described embodiments are provided as examples, and are not intended to limit the scope of the present invention. Each of these novel embodiments can be implemented in any of other various forms, and various omissions, substitutions, and alterations can be made thereto without departing from the spirit of the invention.

For example, the embodiments have been described for the present invention applied to the MFP 1 in which the operating unit 20 is removable with respect to the main unit 10. Nonetheless, the same effects as noted above can still be achieved in a device including a MFP in which an operating unit is fixed to a main unit of the MFP.

Additionally, the MFP 1 in the embodiments is an exemplary device to which the present invention is applied. The present invention may therefore be applied to any device that performs user authentication other than the MFP 1, including a projector device, a TV conference system, and a digital camera device.

The exemplary embodiments of the present invention provide the effect that complications involved in registering user authentication information are eliminated and efficient user authentication is enabled.

The accompanying claims and their equivalents are intended to cover such embodiments or modifications as would fall within the scope and spirit of the invention.

REFERENCE SIGNS LIST

1 Multifunction peripheral (MFP)
10 Main unit
11 CPU
12 ROM
13 RAM
14 HDD
15 Communication I/F
16 Connection I/F
17 Engine
18 Bus line
19 FAX modem
20 Operating unit
21 CPU
22 ROM
23 RAM
24 Flash memory
25 Communication I/F
26 Connection I/F
27 Operating panel
28 Bus line
29 IC card I/F
30 Communication path
40 Network
51 User authentication program
52 Priority user list
53 First authentication module
54 Priority user administration module
55 IC card control module
60 Address book
60*a* Address book
60*b* Address book
61 Successful login attempt record
61*a* Successful login attempt record
61*b* Successful login attempt record
62 Second authentication module
63 User administration module
70 Authentication server device
81 First server device
82 Second server device
87 First authenticator
90 Second authenticator

The invention claimed is:

1. A device, comprising:
first circuitry configured to:
provide a predetermined function,
store in a first storage authentication information used for user authentication, and including user information and unique identification information that is assigned to a storage medium used for user authentication,
control to provide the predetermined function when a user authentication result indicating an authorized user is obtained; and
second circuitry configured to:
acquire the authentication information before performance of the user authentication,
store the acquired authentication information in a second storage,
generate priority user information and store the priority user information in the second storage, the priority user information representing, of the acquired authentication information, authentication information corresponding to a user who has been authenticated in user authentication as the authorized user, to which user authentication time information is added,
acquire the unique identification information that is assigned to the storage medium used by the user for user authentication,
determine whether the acquired unique identification information has already been registered as the authentication information stored in the second storage,
when determining that the acquired unique identification information has been registered as the authentication information stored in the second storage, perform user authentication by collating the acquired unique identification information with unique identification information in the priority user information stored in the second storage, and
when determining that the acquired unique identification information is yet to be registered as the authentication information stored in the second storage, request the user to input user information, and perform user authentication by collating the input user information and the user information in the authentication information stored in the second storage,
wherein the second circuitry is further configured to, when determining that the acquired unique identification information has been registered as the authentication information stored in the second storage, update time information assigned to the priority user information that corresponds to the acquired unique identification information to time information that corresponds to time-of-day at which it is determined that the acquired unique identification information had been registered.

2. The device according to claim 1, wherein the second circuitry is further configured to generate, when determining that the acquired unique identification information is yet to be registered, a new piece of authentication information that associates the input user information with the acquired unique identification information of the storage medium, wherein
the first circuitry is further configured to store the generated new piece of authentication information in the first storage, and
the second circuitry is further configured to generate a new piece of priority user information that represents the new piece of authentication information to which time information of the user authentication is added and store the new piece of priority user information in the second storage.

3. The device according to claim 2, wherein
the second circuitry is further configured to determine, when storing the new piece of priority user information in the second storage, whether a count of pieces of priority user information that have previously been stored in the second storage has reached a predetermined upper limit, when the predetermined upper limit is yet to be reached, the second circuitry is configured to directly store the new piece of priority user information in the second storage, and when the predetermined upper limit has been reached, the second circuitry is configured to delete a specific piece of priority user information to which the oldest time information is assigned before storing the new piece of priority user information in the second storage, or the second circuitry is configured to delete a plurality of pieces of priority user information counted from the specific piece of priority user information to which the oldest time information is assigned before storing the new piece of priority user information in the second storage.

4. A method for an authentication process, the method comprising:

by first circuitry, providing a predetermined function, storing in a first storage authentication information used for user authentication, and including user information and unique identification information that is assigned to a storage medium used for user authentication, controlling to provide the predetermined function when a user authentication result indicating an authorized user is obtained; and by second circuitry, acquiring the authentication information before performance of the user authentication, storing the acquired authentication information in a second storage;

generating priority user information and storing the priority user information in the second storage, the priority user information representing, of the acquired authentication information, authentication information corresponding to a user who has been authenticated in user authentication as the authorized user, to which user authentication time information is added, acquiring the unique identification information that is assigned to the storage medium used by the user for user authentication, determining whether the acquired unique identification information has already been registered as the authentication information stored in the second storage, when determining that the acquired unique identification information has been registered as the authentication information stored in the second storage, performing user authentication by collating the acquired unique identification information with unique identification information in the priority user information stored in the second storage, and when determining that the acquired unique identification information is yet to be registered as the authentication information stored in the second storage, requesting the user to input user information, and performing user authentication by collating the input user information and the user information in the authentication information stored in the second storage, wherein time information assigned to the priority user information that corresponds to the acquired unique identification information to time information that corresponds to time-of-day at which it is determined that the acquired unique identification information had been registered is updated.

5. The method according to claim 4, wherein when it is determined that the acquired unique identification information is yet to be registered, a new piece of authentication information that associates the input user information with the acquired unique identification information of the storage medium is generated, the generated new piece of authentication information is stored in the first storage, and a new piece of priority user information that represents the new piece of authentication information to which time information of the user authentication is added is generated and the new piece of priority user information is stored in the second storage.

6. The method according to claim 5, wherein when storing the new piece of priority user information in the second storage, the second circuitry determines whether a count of pieces of priority user information that have previously been stored in the second storage has reached a predetermined upper limit, when the predetermined upper limit is yet to be reached, the new piece of priority user information is directly stored in the second storage, and when the predetermined upper limit has been reached, a specific piece of priority user information to which the oldest time information is assigned is deleted before storing the new piece of priority user information in the second storage, or a plurality of pieces of priority user information counted from the specific piece of priority user information to which the oldest time information is assigned is deleted before storing the new piece of priority user information in the second storage.

7. A non-transitory computer readable medium storing computer readable instructions thereon that, when executed by a computer, causes the computer to perform a method comprising:

by first circuitry of the computer, storing in a first storage authentication information used for user authentication, and including user information and unique identification information that is assigned to a storage medium used for user authentication, controlling to provide a predetermined function when a user authentication result indicating an authorized user is obtained; and by second circuitry of the computer, acquiring the authentication information before performance of the user authentication, storing the acquired authentication information in a second storage, generating priority user information and storing the priority user information in the second storage, the priority user information representing, of the acquired authentication information, authentication information corresponding to a user who has been authenticated in user authentication as the authorized user, to which user authentication time information is added, acquiring the unique identification information that is assigned to the storage medium used by the user for user authentication, determining whether the acquired unique identification information has already been registered as the authentication information stored in the second storage, when determining that the acquired unique identification information has been registered as the authentication information stored in the second storage, performing user authentication by collating the acquired unique identification information with unique identification information in the priority user information stored in the second storage, and when determining that the acquired unique identification information is yet to be registered as the authentication information stored in the second storage, requesting the user to input user information, and performing user authentication by collating the input user information and the user information in the authentication information stored in the second storage, wherein time information assigned to the priority user information that corresponds to the acquired unique identification information to time information that corresponds to time-of-day at which it is determined that the acquired unique identification information had been registered is updated.

\* \* \* \* \*